(No Model.)
W. A. WILKINSON.
FRICTION CLUTCH.
No. 482,326. Patented Sept. 6, 1892.
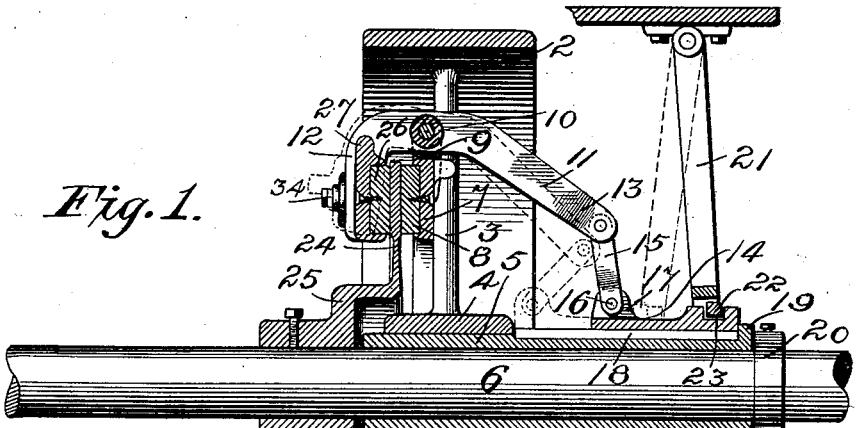
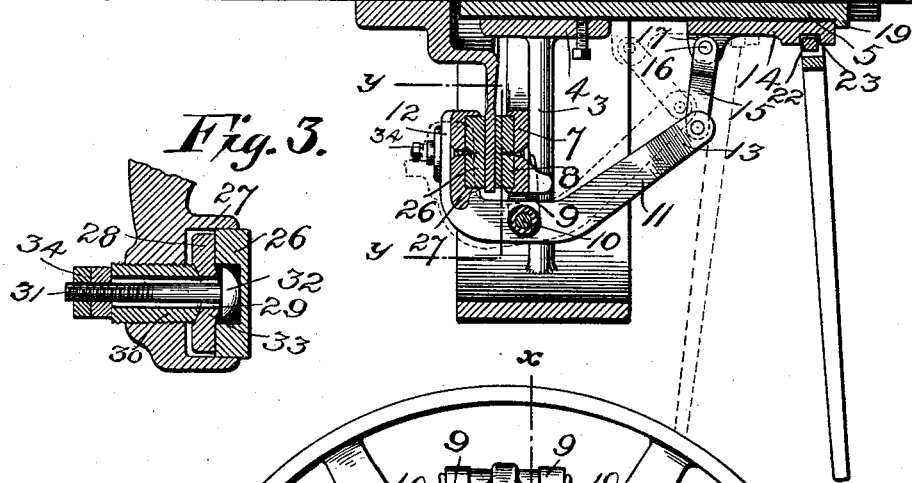
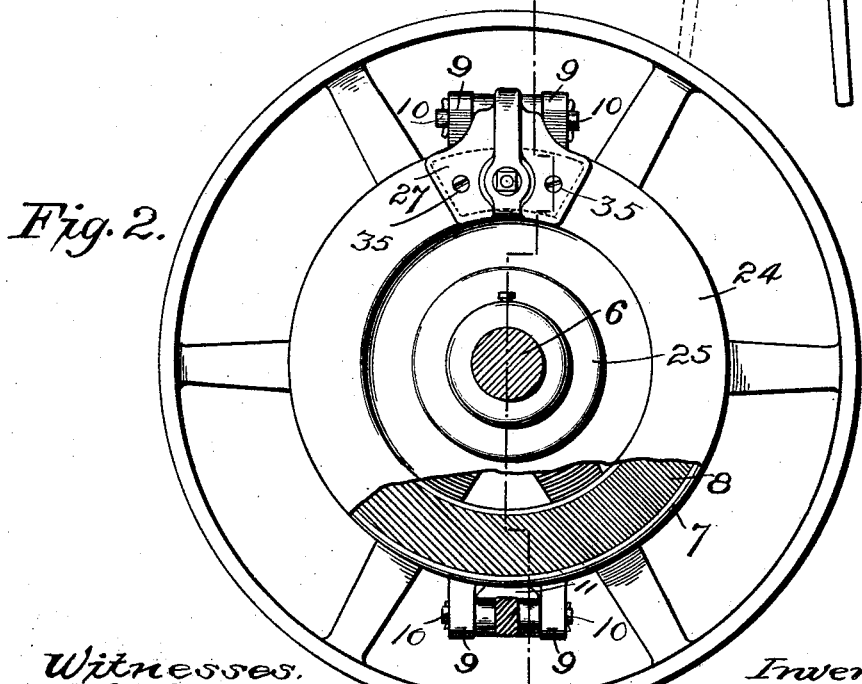
Witnesses.
C. E. Van Doren.
C. G. Hawley
Inventor,
William A. Wilkinson.
By Paul & Merwin Att'ys.
THE NORRIS PETERS CO., PHOTO-LITHO., WASHINGTON, D. C.

UNITED STATES PATENT OFFICE.

WILLIAM A. WILKINSON, OF MINNEAPOLIS, MINNESOTA.

FRICTION-CLUTCH.

SPECIFICATION forming part of Letters Patent No. 482,326, dated September 6, 1892.

Application filed November 6, 1891. Serial No. 411,044. (No model.)

*To all whom it may concern:*

Be it known that I, WILLIAM A. WILKINSON, of Minneapolis, in the county of Hennepin and State of Minnesota, have invented certain Improvements in Friction-Clutches, of which the following is a specification.

My invention relates to friction-clutches; and its object is to simplify and cheapen the construction of the same and render the same more durable, certain, and effective in use.

To this end my invention consists in general in the constructions and combinations hereinafter described, and particularly pointed out in the claims.

The invention will be more readily understood by reference to the accompanying drawings, in which—

Figure 1 is a longitudinal sectional view of a friction-clutch embodying my invention, the section being taken on the line $xx$ of Fig. 2. Fig. 2 is a front elevation thereof, the end of the shaft being sectioned and a portion of the disk and of the gripping device being for clearness cut away on the line $y y$ of Fig. 1. Fig. 3 is a sectional detail showing the manner of securing the wooden friction-block to the movable clamping-jaws.

As shown in the drawings, the pulley 2, having the spokes 3 and the central hub 4, is secured by the hub upon the sleeve 5, loosely journaled upon the shaft 6.

On the spokes 3 I secure or cast integrally therewith the metal ring 7, provided with the wide groove to receive the wooden blocks 8, making up a wooden friction-ring. This ring carries the lugs 9, in which the pins or clamps 10 are secured, by means of which the arms 11, having inwardly-extending jaw ends 12, are pivoted on the pulley and made to move therewith. The other ends 13 of these arms 11 are pivotally connected to the sliding sleeve 14 by the links 15, fastened by the pins 16 to the lug 17 on said sleeve. The sleeve 14 may be prevented from turning on the sleeve 5 by the feather or spline 18, and is free to move longitudinally on the sleeve, being prevented from slipping off the end thereof by the shoulder 19 and the collar 20, which collar prevents longitudinal movement of the sleeve or bushing 5 on the shaft.

21 represents the shipper-rod pivotally secured to the wall or ceiling and having the yoke 22, arranged in the groove 23, provided in the sleeve 14.

On the other side of the pulley I provide the disk 24, adapted to be engaged by the levers or arms and having the heavy sleeve, hub, or boss 25, tightly fitting the shaft 6 and secured and immovably fixed thereon. The wooden block 8 and the pulley whereon the same is secured are adjusted by moving the hub of the sleeve 5, so that when the clutch is off or unfastened the wooden block 8 stands just free of the face of the disk 24. To engage the other side of the disk, I provide wooden blocks 26, one of the same being fastened in the end 12 of each gripping jaw or arm 11. The arms 11 and the links 15 act as elbow-joints, and when the sleeve 14 is pulled out into the position shown in Fig. 1 the blocks 26 are firmly pressed against the disk, gripping the same, the block 8 is drawn tightly into engagement with the disk, whereupon the pulley 2 is caused to rotate with the shaft. The wooden blocks 26 are arranged in a sector-like form in the recessed jaws 27 of a corresponding shape and formed on the arms or levers 11. I secure the blocks adjustably in the jaws by means shown in detail in Fig. 3, where 27 indicates the jaw and 26 the wooden block, which is screwed upon the iron follower-plate 28. This follower-plate is provided with the ball-surface 29, whereby it is journaled upon the similarly-shaped end of the threaded sleeve 30. Thus it will be seen that the block may move freely to adjust itself to any angle that the face of the disk may assume. The follower-plate is secured in the jaw by the bolt 31, the head 32 of which bears on the convex ball-surface 33 provided on the plate 28. The opening through the plate 28 is larger than the bolt 31, so that the plate may move free with respect to the same, which is firmly locked by the nuts 34. One of these ball-bearing attachments is provided for each block 26. The ends of the block are prevented from excessive wabbling by extra screws 35, inserted through the jaw and into the same.

Several pairs instead of one pair of gripping devices may be employed, the arms thereof being arranged between each pair of spokes of the pulley.

When my device is employed in connecting the ends of two shafts, the disk is fastened on one shaft and the other parts of the clutch permanently fastened on the other shaft, and in case a gear is to be driven the gearwheel is formed with or fixed to the hub of the disk and the other parts arranged on the end of the shaft, the bushing or sleeve 5 being dispensed with.

The gripping devices and friction-disk being the principal parts wherein my invention is embodied these changes may obviously be made without departing from the spirit of my invention; and I therefore do not confine myself to the specific construction shown and described.

Having thus described my invention, I claim as new and desire to secure by Letters Patent—

1. The combination, in a friction-clutch, of the shaft with the sleeve 5 loosely journaled thereon, the pulley fixed on said sleeve, the sleeve 14, slidably secured on the sleeve 5 and adapted to move therewith, a shipper-rod for moving said sleeve 14 longitudinally, the recessed ring 7, fixed with respect to the pulley, the wooden ring 8, fixed thereon, the arms or levers 11, lugs fixed with respect to the ring 7 and whereon said levers are pivoted, the inwardly-extending ends of said levers provided with sector-like recessed jaws 27, having the wooden friction-blocks 26, the friction-disk 24, arranged between said blocks and wooden ring and having a strong hub 25 securely fixed on the shaft, links 15, pivotally connecting the ends 13 of the levers 11 with said sliding sleeve 14, said blocks 26 being pivotally secured in said jaws and adapted to adjust themselves to the disk when pressed into contact therewith, substantially as described.

2. The combination, with the shaft, of a friction-disk fixed thereon, the pulley loosely arranged with respect to the same, the friction device thereon, levers or arms 11, having jaws 27, the wooden blocks 26, arranged therein, follower-plates 28, whereon the same are secured, the threaded sleeve 30, having the ball-bearing end to engage the followers, said followers provided with the ball-bearing surfaces 33, and the locking-bolts 31, having heads bearing on said surfaces 33 and secured by nuts 34, substantially as described.

In testimony whereof I have hereunto set my hand this 27th day of October, 1891.

WILLIAM A. WILKINSON.

In presence of—
C. G. HAWLEY,
F. S. LYON.